United States Patent [19]
Rallapalli et al.

[11] Patent Number: 4,562,484
[45] Date of Patent: Dec. 31, 1985

[54] METHOD AND DEVICE FOR DECODING TWO-DIMENSIONAL FACSIMILE SIGNALS

[75] Inventors: Krishna Rallapalli, San Jose; Shinkyo Kaku, Los Gatos, both of Calif.

[73] Assignee: Advanced Micro Devices, Inc., Sunnyvale, Calif.

[21] Appl. No.: 524,816

[22] Filed: Aug. 19, 1983

[51] Int. Cl.[4] .............................................. H04N 1/40
[52] U.S. Cl. .................................................. 358/261
[58] Field of Search .............................. 358/266, 261; 340/347 DD

[56] References Cited

U.S. PATENT DOCUMENTS

| | | | |
|---|---|---|---|
| 3,830,965 | 8/1974 | Beaudette | 358/261 |
| 3,927,251 | 12/1975 | White et al. | 358/261 |
| 3,991,267 | 11/1976 | Beaudette | 358/261 |
| 4,040,093 | 8/1977 | Nakagome et al. | 358/261 |
| 4,048,656 | 9/1977 | Ishii et al. | 358/261 |
| 4,115,815 | 9/1978 | Nakagome et al. | 358/261 |
| 4,117,517 | 9/1978 | Shintani et al. | 358/261 |
| 4,156,880 | 5/1979 | Yamada | 358/261 |
| 4,212,035 | 7/1980 | Nakagome et al. | 358/261 |
| 4,212,036 | 7/1980 | Nakagome et al. | 358/261 |
| 4,245,257 | 1/1981 | Yamazaki et al. | 358/261 |
| 4,258,392 | 3/1981 | Yamazaki et al. | 358/261 |
| 4,486,784 | 12/1984 | Abraham et al. | 358/261 |

Primary Examiner—Edward L. Coles, Sr.
Attorney, Agent, or Firm—Patrick T. King; Gary T. Aka

[57] ABSTRACT

A method and device for decoding two-dimensionally encoded digital facsimile signals. The method includes (a) accumulating the run lengths of color change picture elements in the reference line, (b) decoding a codeword to generate a displacement value, (c) combining the accumulated run length of a reference line color change picture element and a displacement value to obtain accumulated run lengths of coded line color change picture elements, and (d) determining the difference between accumulated run lengths of a coded line color change picture element. The difference is the decoded data. The device has a control logic, a reference line processor for generating the accumulated run lengths of color change picture elements in the reference line, a coded line processor for generating displacement values from the encoded codewords, and a combining part for combining the reference line accumulated run lengths and the displacement values to obtain the accumulated run lengths of color change picture elements in the coded line and for determining the differences between coded line accumulated run lengths, which are the decoded run lengths of the color units in the coded line.

13 Claims, 16 Drawing Figures

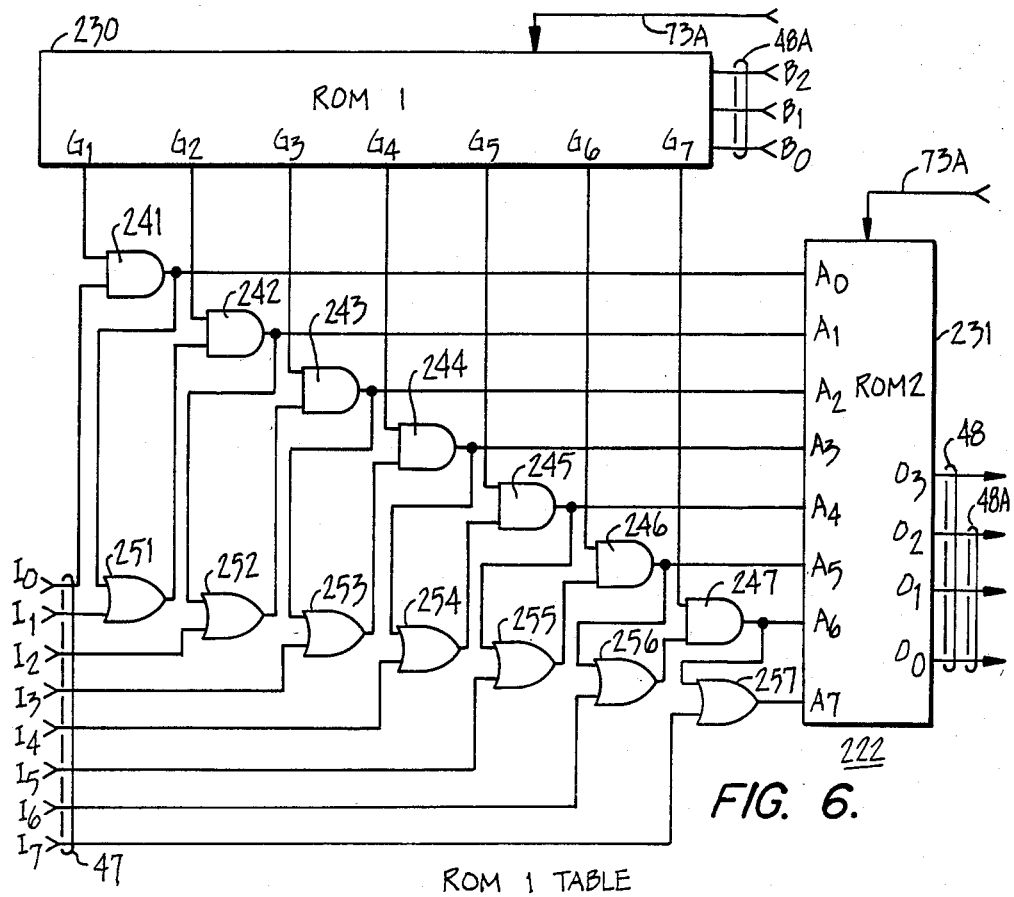

4,562,484

METHOD AND DEVICE FOR DECODING TWO-DIMENSIONAL FACSIMILE SIGNALS

FIELD OF THE INVENTION

The present invention relates to digital facsimile systems and, more particularly, to a decoder for use in a facsimile receiver for reforming the picture elements from two-dimensional facsimile transmission signals.

BACKGROUND OF THE INVENTION

In digital facsimile systems a document is scanned line by line to generate digitized data. Each bit of information, either a "1" or "0", corresponds to a small area on the document. The "color" of the area, i.e., whether the area is white or black, determines whether the associated binary signal is a "0" or a "1", respectively.

These lines of picture data are normally comprised of units of alternating color having various run lengths. For example, a line of picture data might have a white color unit of ten picture elements which represents a blank space in the document. This first color unit has a run length of ten. The next color unit is naturally black and may contain five picture elements for a run length of five. This color unit may represent part of a character on the document. Thus each line of picture data has an alternating sequence of white and black color units, each having a particular run length.

Since the straightforward transmission of this data may involve a large amount of digital information and may therefore consume much time, recent advances in the facsimile field have been made in the encoding of the information so that the amount of data which is required for transmission is compressed. These advances include the sequential coding of run lengths, color unit by color unit on a line, and line by line until the entire document is coded. This is called one-dimensional or run length coding. Another approach is the sequential coding of the positions of the first picture element of each color unit in a line to be coded (the coding line) with respect to the positions of the first picture element of color units in a line which has already been coded (the reference line). This coding procedure, which is repeated line by line, is called two-dimensional coding. For an explanation of digital coding standards, see "International Digital Facsimile Coding Standards," by R. Hunter and A. H. Robinson in the *Preceeding of the IEEE*, Volume 68, No. 7, July 1980, pages 854–867.

The present applicants have also developed a method of an a device for coding facsimile data in accordance with the above coding procedure. A disclosure of this method and the device is made in a patent application, U.S. Ser. No. 524,919, entitled METHOD AND DEVICE FOR TWO-DIMENSIONAL FACSIMILE CODING, filed of even date by the present applications. A related invention is disclosed in another patent application U.S. Ser. No. 524,917, entitled A FACSIMILE DEVICE FOR RUN LENGTH CODING, also filed of even date by the present application.

The encoded data is transmitted to a distant location, received, and reformed to obtain a copy of the original document. The facsimile receiver has a decoding unit for decoding the compressed data into signals indicating the run lengths of successive color units. These run length signals are fed into a picture element generating unit which transforms the run length signals to picture element signals to reform the original document color unit by color unit and line by line. In an ideal transmission-reception there should be a one-to-one correspondence between the picture elements at the transmission end and the picture elements at the reception end.

The basic structure of a facsimile receiver is shown in FIG. 1. The timing and the operation of a decoder unit 310 and a picture element generator 313 is controlled by a control logic unit 315 which communicates with the decoder by a control path 316 and to the picture element generator along a data path 317. The decoder 310 receives the encoded data on a data path 311. This data is in the form of a sequence of "1"'s and "0"'s which correspond to lines of a document which has been scanned by the digital facsimile transmitter. This encoded data is represented by an arbitrary sequence in the uppermost line of data in FIG. 1.

The encoded data signals are accepted by the decoder 310 and transformed into run length data which indicate the color and run length of sequential color units. FIG. 1 shows that first line of data corresponds to a sequence of color units starting on the left with a white color unit of two picture elements, a black unit with two picture elements, a third white color unit with three elements and so forth.

The run length data enters the picture element generator 313 on the data path 312. The generator 313 then forms the picture element data from the run length data. Corresponding to the initial white color unit of two picture elements, the picture element data generates with two ZERO signals. Corresponding to the black color unit of two pictures elements, the picture element generator 313 forms two ONE signals after the picture elements for the first color unit. Then the picture element generator 313 generates three ZEROS corresponding to the third white color unit and so on.

One such novel picture element generator suitable for high speed operation and integration using VLSI (Very Large Scale Integration) technology is disclosed in a patent application, U.S. Ser. No. 524,957, filed of even date by the present applicants, entitled PICTURE ELEMENT GENERATOR FOR FACSIMILE RECEIVER.

The picture element data is then sent to a printer or other marking device and, with a one for one relationship, sets the picture element data signals down on a copy. The bottommost line illustrates the physical representation of the picture element data signals. By line by line decoding, picture element generation, and printing, a copy of the original document is formed and the facsimile operation performed.

The present invention is directed toward a high speed decoding unit. In the prior art the coded or compressed data is stored in a memory and decoded or expanded by the decoding logic. This data after being loaded in parallel into the memory is processed by the decoding logic one bit at a time to perform the expansion of the data into the original picture element data. This process of data one bit at a time is an obstacle to high speed operation. As can be seen in U.S. Pat. No. 4,258,392, issued to Y. Yamazaki et al. on Mar. 24, 1981, the decoding process requires the determination of $a_0$, $a_1$, $a_2$, $b_1$ and $b_2$ picture elements and the calculation of terms such as $a_0-b_1$, $a_0-b_2$, $b_2-a_2$, $b_1-a_1$, $a_0-a_1$ and $a_1-a_2$. The determination and monitoring of the $a_0$ picture element and the control of the load address of the reference line memory require extremely complicated logic. Furthermore, the address control is complicated and the decoding procedure is slow by the bit by bit processing required.

The present invention avoids many of these problems to achieve a high speed decoding unit suitable for VLSI integration.

SUMMARY OF THE INVENTION

To achieve these results the present invention in a facsimile system for digitized picture elements of the lines of units of alternating color, provides for a method of decoding a line of the digitized picture elements coded in a sequence of code words with respect to a reference line of the digitized picture elements, the method comprising (a) accumulating the run lengths of color units previous to a color change picture element in the reference line, (b) decoding a codeword to generate a displacement value, (c) combining the accumulated run lengths of the reference line color units and the displacement value to generate the accumulated run length of a color change picture element in the coding line, and (d) determining the difference in the accumulated run lengths between the color change picture element and the color change picture element immediately previous on the coding line, whereby the difference being the run length of the color unit previous to the color change picture element is the decoded data from the codeword.

The present invention also provides that the steps (a), (b), (c), and (d) are selectively repeated in predetermined sequences responsive to a determination of the accumulated run lengths of the reference line color change picture element and the color change picture element previous to the reference line color change picture element with respect to the accumulated run length of the coding line color change picture element, each repetition of steps applying successive color change picture elements in the coding and reference lines.

The present invention also provides for a facsimile device for decoding the positions of color change picture elements in a coding line of digitized picture data coded in a sequence of codewords with respect to the position of color change picture elements in a reference line of digitized picture data, the device comprising a control logic for controlling the operations of the device; first means coupled to the control logic and responsive to the reference line picture data, for sequentially generating in parallel the accumulated run lengths of each color change picture element in the reference line; second means coupled to said control logic and responsive to the codewords for generating displacement values; third means, coupled to the control logic, first and second means, for combining the reference line accumulated run lengths and the displacement values to sequentially generate the accumulated run lengths of color change picture elements in the coding line; and fourth means, coupled to the control logic and third means, for generating the difference in accumulated run lengths for consecutive color change picture elements in the coding line to generate the run lengths of color units between the consecutive color change picture elements; whereby the generated run lengths are decoded from the codeword sequence.

The facsimile device is also characterized by the fact that the first means receives the reference line picture data in data blocks and generates in a single clock cycle the accumulated run length of a color change picture element in a data block provided that the previous color change picture element in also in the data block.

BRIEF DESCRIPTION OF THE DRAWINGS

A deeper understanding of the present invention may be obtained by a perusal of the DETAILED DESCRIPTION OF EMBODIMENTS OF THE INVENTION with reference to the following drawings:

FIG. 3 is a unitary drawing of FIGS. 3A, 3B and 3C.

FIG. 6 is a detailed schematic drawing of part of the accumulated run length generator block in FIG. 4.

FIGS. 7 and 8 show the input/output tables of the ROMs shown in FIG. 6.

DETAILED DESCRIPTION OF EMBODIMENTS OF THE INVENTION

Figure 1:
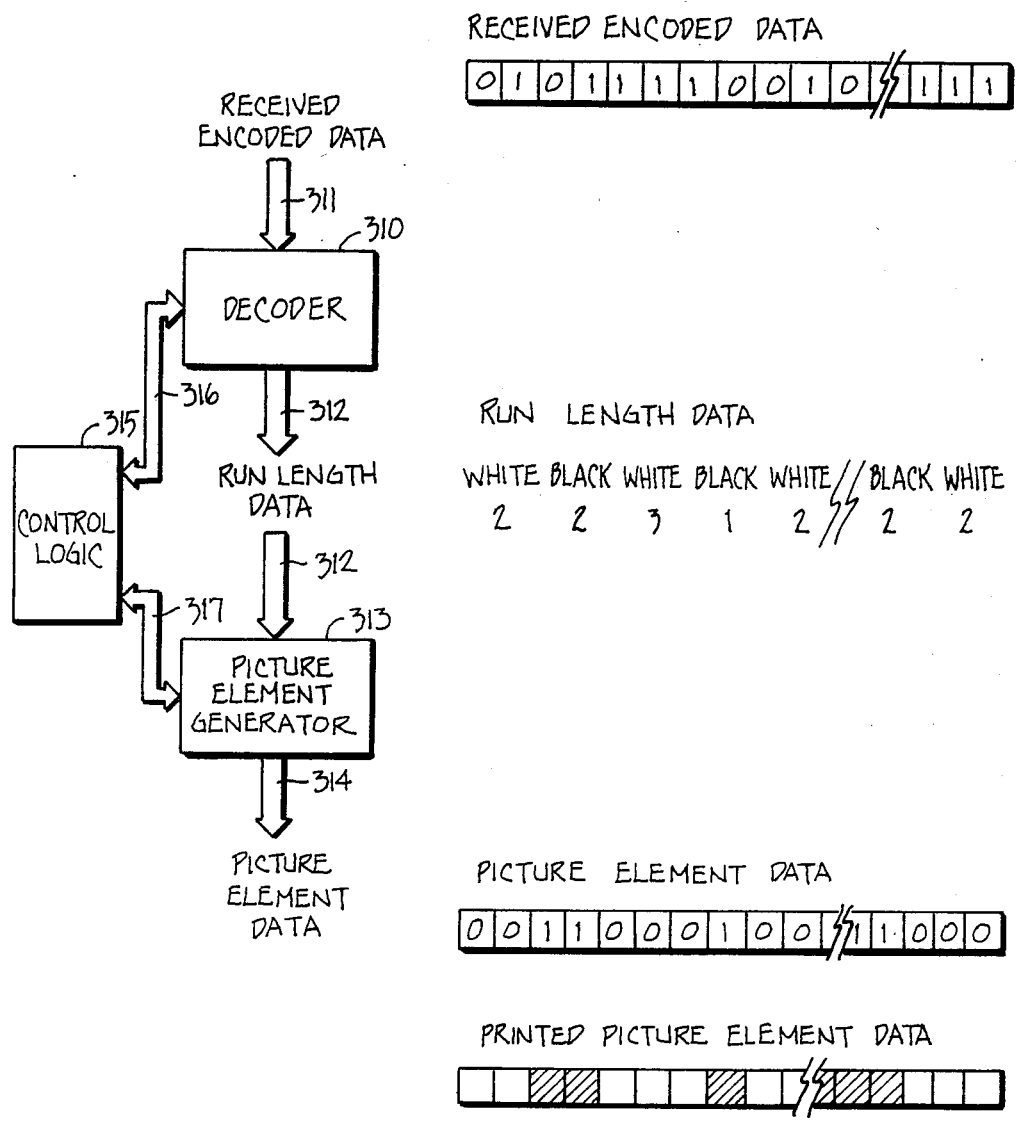
FIG. 1 is a digital facsimile receiver in which the location and operation of a decoder unit is illustrated; data showing the various stages of processing by the facsimile receiver are placed to the right of corresponding parts of the receiver.

An understanding of the modified READ (Relative Element Address Designate) coding procedure defined by the CCITT T.4 standards in the above IEEE paper is useful in understanding the decoding method and device of the present invention.

The standard identifies five change picture elements, which are elements whose "color" differs from the previous color element on the same scan line. The first change picture element is the $a_0$ color change picture element on the coding line. This element is a reference point for the other following defined change picture elements. The $a_1$ color change picture element is the first change picture element in the scanning direction whose color is opposite to that of the reference element. The $a_2$ color change picture element is the first change picture element in the scanning direction having its color opposite from the $a_1$ change picture element and the same as the $a_0$ change picture element.

In the reference line the $b_1$ color change picture element is the first such element following the reference $a_0$ element in the scanning direction having a color opposite from the $a_0$ element and the same as the $a_1$ element. The final element is the $b_2$ color change picture element, which is the first change picture element following the $b_1$ element in the scanning direction and having a color opposite to that of the $b_1$ element and the same as the $a_2$ element.

In the explanation that follows, the scanning direction is always shown as proceeding from left to right, though there is no technical reason why the opposite direction may not be chosen.

The coding procedure is to generally find a spatial correlation between the $a_1$ and $b_1$ change picture elements. If such is not the case, then run length coding, i.e., one-dimensional coding, is used. In this way information about the coding line can be sent with respect to a known reference line. After $a_1$ has been coded, then the starting or reference element $a_0$ is redefined and the procedure starts over again until the coding line is completely coded.

Thus the CCITT T.4 standard has three coding modes. The first coding mode is the pass mode. This occurs when the position of the $b_2$ element lies to the left of the $a_1$ element. What occurs here is that the reference line has more change picture elements from which to code the $a_1$ element in the coding line than is needed. In such a case, the coding pocedure is to issue a special coding word indicating "pass" and resets the reference element $a_0$ under the $b_2$ element to start the coding procedure again. The $a_1$, $a_2$, $b_1$, $b_2$ are redefined accordingly.

If the pass mode is not detected, then the distance in the horizontal direction between $a_1$ and $b_1$ is determined. If the horizontal distance is equal to or less than 3 picture elements, then this distance, the relative position of $a_1$ with respect to $b_1$, is coded. The next coding begins with former $a_1$ being defined as the $a_0$ reference element. The new $a_1$, $a_2$, $b_1$, $b_2$, elements correspondingly determined and the coding cycle is iterated.

On the other hand, if the horizontal distance between $a_1$ and $b_1$ are greater than 3 picture elements, the positions $a_1$ and $a_2$ are coded by the one-dimensional coding method. A codeword indicating that this horizontal mode has been entered and code words indicating the distance between the $a_0$ and $a_1$ elements and the distance between the $a_1$ and $a_2$ elements is generated. After this coding the reference element $a_0$ is redefined and reset in the original $a_2$ position and new $a_1$, $a_2$, $b_1$, $b_2$, are determined for the next coding.

Figure 2A:
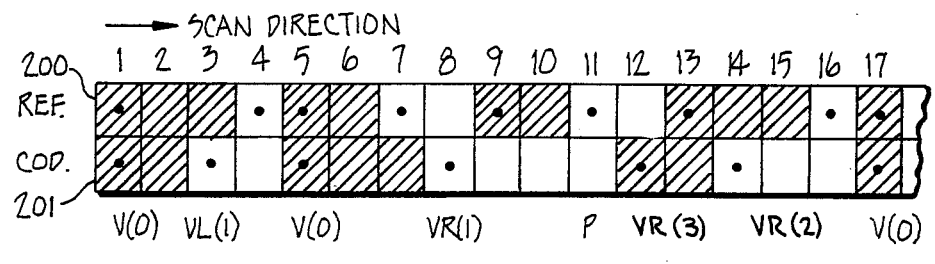
FIGS. 2A, 2B and 2C are exemplary picture data coded in accordance with modified READ code of the CCITT T.4 recommended standard; the codewords are immediately below each coding line.
Figure 2B:
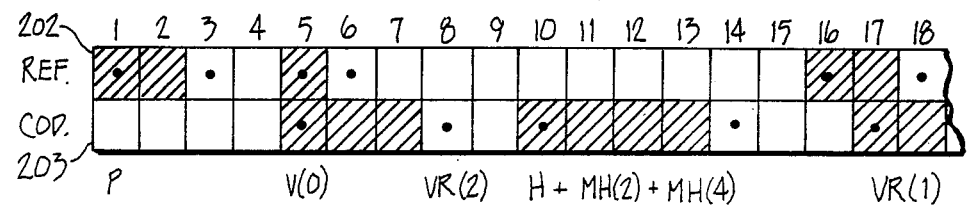

FIGS. 2A and 2B present illustrative examples of this two-dimensional coding procedure. In FIG. 2A a coding line 201 is coded with respect to a reference line 200. The picture element positions of each line are numbered from 1 to 17, though, as indicated in the drawing, the lines and the picture elements continue. Each color change picture element is indicated with a dot in the center of its area.

Under the coding procedure above, at the start of a coding line the $a_0$ element is set on an imaginary white color change element situated just before the first actual element on the coding line. In FIG. 2A the first $a_0$ element is an imaginary element immediately to the left of the number 1 picture element. The first color change elements in the reference and coding lines are both black; thus they become the $b_1$ and $a_1$ elements respectively. The fourth picture element in the reference line is $b_2$ while the third picture element in the coding line is $a_2$. Since $a_1$ is located immediately below $b_1$, a vertical mode code "V(0)" is appropriate. Next, the first picture element in the coding line become the position of the new $a_0$ change picture element. The third picture element becomes $a_1$ and the fifth becomes $a_2$ in the coding line. In the reference line the fourth picture element is $b_1$ and the fifth $b_2$. Since $a_1$ in this case is one picture element to the left of the new $b_1$, the second color change element in the coding is appropriately coded "VL(1)", indicating that $a_1$ is located one picture element to the left of $b_1$.

The iterative procedure continues with $a_0$ being defined as the third picture element in the coding line. The fifth and eighth picture elements become $a_1$ and $a_2$ respectively. In the reference line above, the fifth and seventh picture elements become $b_1$ and $b_2$ respectively. The fourth picture element in the coding line cannot be $b_1$ since it is the same color as $a_0$. Since $b_1$ is immediately above $a_1$, $a_1$ in this case is appropriately coded "V(0)."

The reference element $a_0$ then moves to the fifth picture element in the coding line with the eighth picture element being $a_1$ and the twelfth $a_2$. The seventh and ninth picture elements in the reference line are $b_1$ and $b_2$ respectively. This yields a coding of "VR(1)". The $a_1$ element is located to the right of $b_1$ by one picture element.

With the eighth color picture element in the coding line becoming $a_0$ the twelfth is $a_1$ and the fourteenth $a_2$. The ninth and eleventh picture elements in the reference line are $b_1$ and $b_2$ respectively. Coding for the twelfth picture element in the coding line is "VR(3)", indicating that $a_1$ is three picture elements to the right of $b_1$.

In a similar fashion the next two color change elements in the coding line are vertically coded "VR(2)" and "V(0)".

In FIG. 2B in which a coding line 203 is coded with respect to a reference line 202, the pass mode and horizontal mode of the two-dimensional coding procedure is demonstrated.

Since the coding line 203 is at its begining, $a_0$ is presumed to exist immediately to the left of the first picture element in the coding line 203. The first appearing color change element opposite in color to $a_0$, which is presumed to be white, is located at the fifth picture element of the coding line 203. This is $a_1$. The eighth picture element is $a_2$. In the reference line 202 the first color change element of opposite color to $a_0$ is in the first position. It is $b_1$. The $b_2$ is located at the third picture element in the reference line 202. Since $b_2$ appears before $a_1$, the "P" code, indicating the pass mode, is appropriate.

Next, the reference $a_0$ is then moved to the picture element immediately below the original $b_2$ which, in this case, is the thrid picture element. The change picture elements $a_1$, $a_2$, $b_1$ and $b_2$ are also redefined. The redefined $a_1$ element is now located in the fifth poition and the redefined $a_2$ element located in the eighth position in the coding line 203; in the reference line 202 redefined $b_1$ and $b_2$ are in the fifth and sixth positions respectively. Thus redefined $a_1$ is coded "V(0)." For the coding cycle, $a_0$ is defined at the fifth position on the coding line 203. The $a_1$ is now located in the eighth position and $b_1$ in the sixth position in the coding line 202. This leads to a coding of "VR(2)", since $a_1$ is two picture elements to the right of $b_1$.

The reference element $a_0$ is then relocated in the eighth position in the coding line 203 making the tenth and fourteenth positions $a_1$ and $a_2$ respectively. However, $b_1$ does not occur until the sixteenth position in the reference line 202. The horizontal distance between $a_1$ and $b_1$ is greater than 3 picture elements so that the horizontal mode is entered. A special "H" signal is generated indicating horizontal mode signals and the "MH(2)" and "MH(4)" signals follow. These two signals respectively indicate the horizontal distance between $a_0$–$a_1$ and $a_1$–$a_2$. It should be noted that these distances are also the run lengths of color units immediately proceeding the $a_1$ and $a_2$ change picture elements.

The reference change picute element $a_0$ moves to the fourteenth position, the former $a_2$ element. The $a_1$ element is at the seventeenth position of the coding line 13 and $b_1$ the sixteenth position of the reference line 202. This yields a vertical coding of "VR(1)."

Figure 2C:
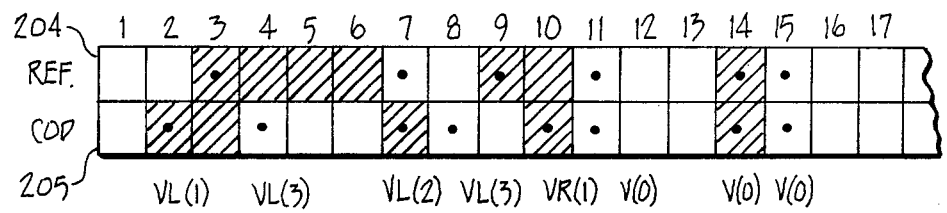

The coding line 205 in FIG. 2C is similarly encoded with respect to the reference line 204. The example is used later to illustrate some of the details of the decoding process of this invention.

For the purposes of this disclosure, symbols which are easily understood are used. "V(0),""VR(X)" and "VL(x)," X from 1 to 3, represent the vertical mode codewords; "P" represents the pass mode. "H" and "MH(Y)" represent horizontal mode codewords; "H" merely indicating the horizontal mode and "MH(Y)" the horizontal run lengths. Of course, each of these representations correspond to digital signals. Codewords which are defined by international standards. See the IEEE paper by Hunter and Robinson referred to above.

THE DECODING METHOD OF THE PRESENT INVENTION

The decoding method of the present invention expands the codewords compressed by the modified READ code of the CCITT T.4 recommended standard into the run lengths of the color units in the coding line. The method changes the data shown in FIG. 1 on the data path 311 and transforms the data into that on the path 312.

The decoding method sequentially generates and stores the accumulated run length of each color unit in the reference line. The accumulated run length is the sum of all previous color units in a line of picture data plus the run length of the subject color unit. In terms of color change picture elements, the accumulated run length of a color unit defines the position of the color change picture element which starts the next color unit in the line. For example, if a color change picture element is in the 1,006 picture element position in a line, the accumulated run length of the color unit immediately preceding the color change picture element determines the position of the color change picture element. The accumulated run length of that color unit will be 1005. The present method basically generates the run lengths of color units in the coding line by first generating the accumulated run length of the color unit preceding the color change picture element in the reference line ($b_1$ in the language of the CCITT T.4 recommended standard) by which a color change element in the coding line has been encoded.

Figure 3C:
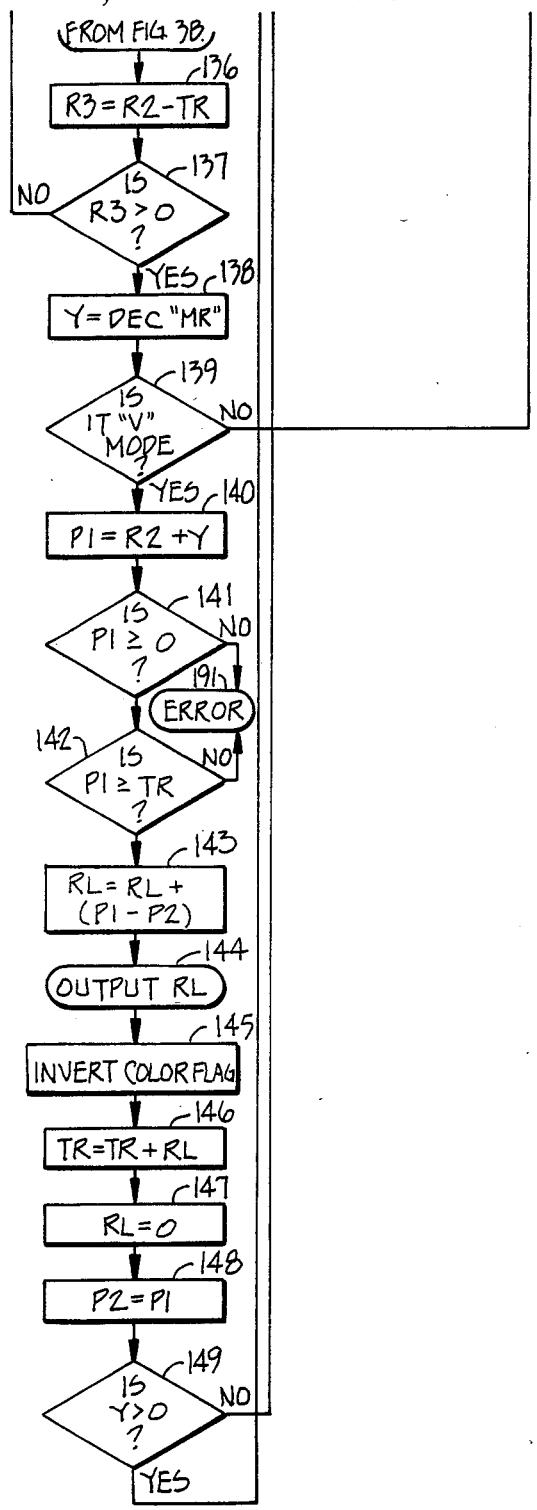
FIG. 3 illustrates the detailed steps of the decoding method of the present invention.
Figure 3:
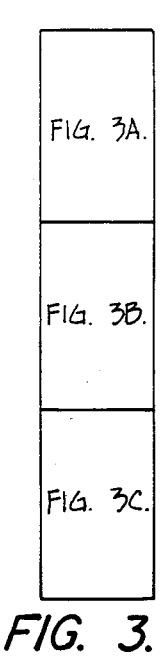
Figure 3A:
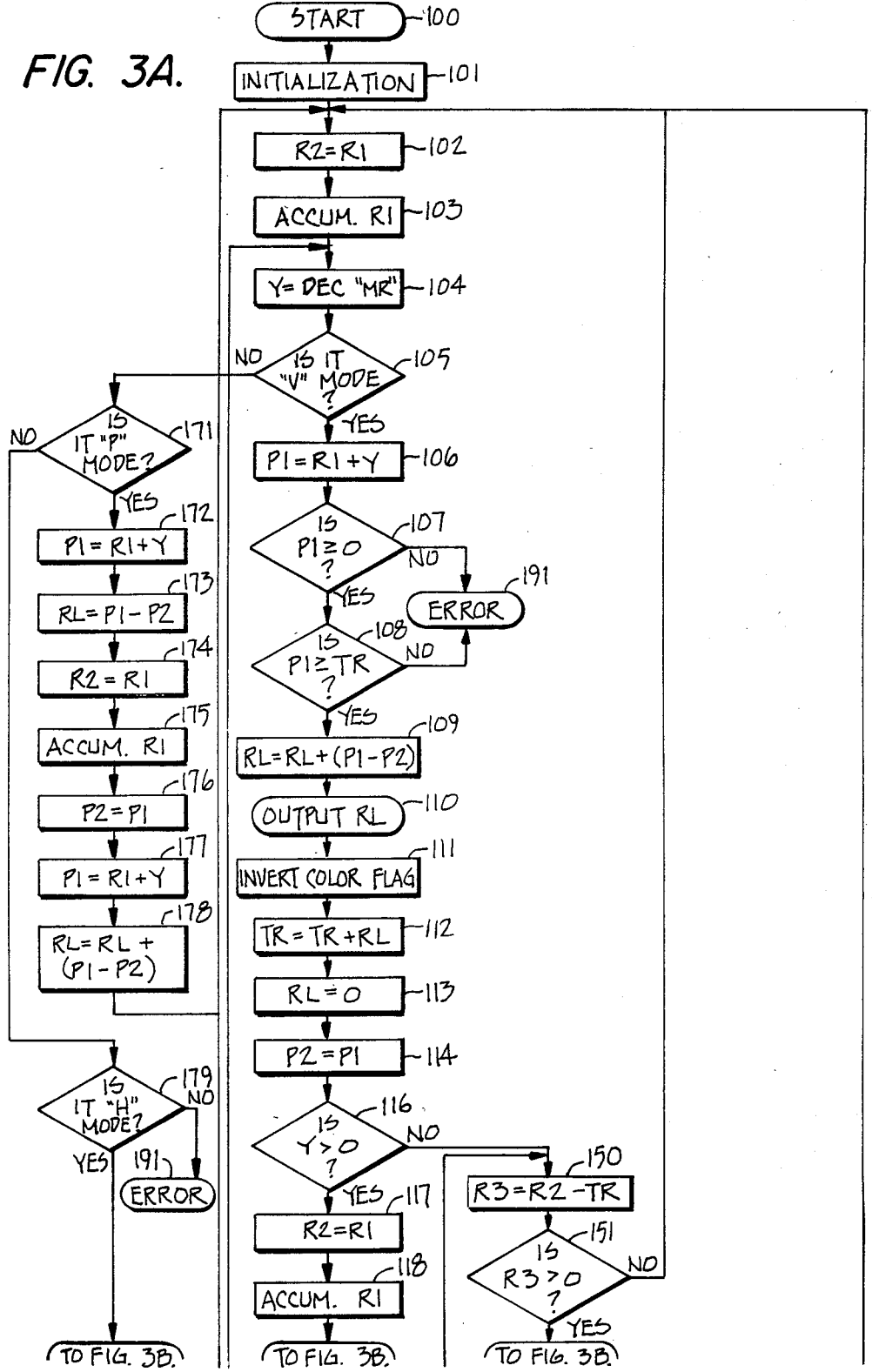
Figure 3B:
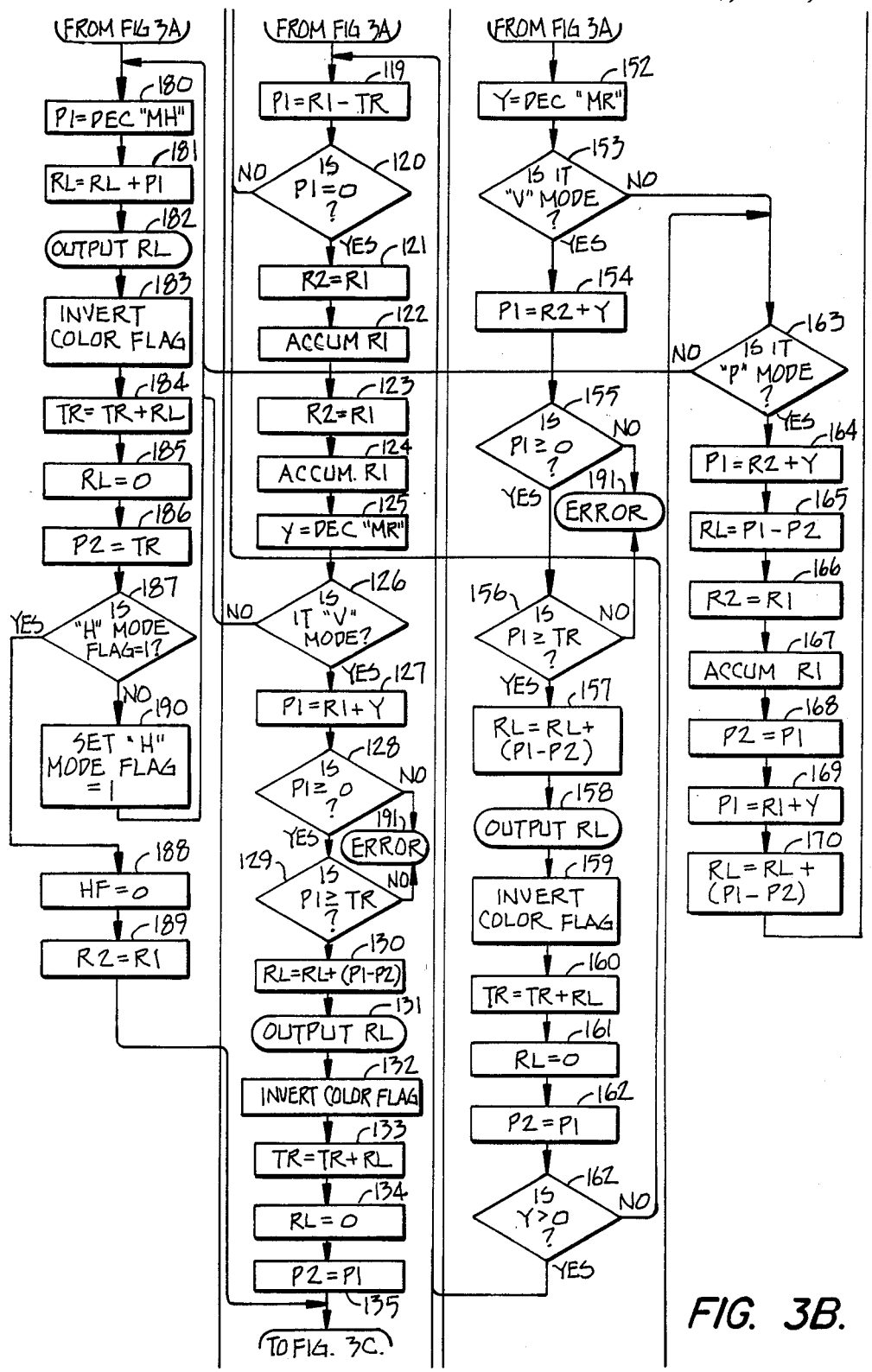

The decoding method of the present invention is detailed in the unitary drawing FIG. 3 comprised of parts FIG. 3A, FIG. 3B and FIG. 3C. References are made to different registers which are used in the decoding process. An explanation of their operation and location within the circuitry of the present invention is made later. These registers function in the decoding method as follows:

The R1 register is used to hold the current value of the accumulated run length for a color unit or, equivalently, its following color change picture element.

The R2 register holds the accumulated run length of the color unit immediately preceding the current color unit in the reference line.

Y represents the decoded displacement value from these accumulated run lengths so as to define the accumulated run length or position of the color change picture element in the coding line.

The P1 register normally stores this accumulated run length for the position of the color change picture element in the coding line, e.g., as in the step 106.

The P2 register stores the accumulated run length of the previous color change picture element in the coding line so that the difference between the values in the P1 and P2 registers is the run length of the color unit between the present color change picture element and the previous color change picture element. The previous color change picture element is simply the first picture element in this color unit, which immediately precedes the present color change picture element in the coding line.

This value, the run length of the current color unit in the coding line, is loaded into the RL register and sent as an output signal to the picture element generator.

The TR register simply stores the total accumulated run length of the coded portion in the coding line.

The R3 register is used for the storage of results of a calculation to help determine which branch the coding process should proceed upon.

The Y displacement values for the vertical mode codewords are as follows:

| Codeword | Y |
| --- | --- |
| V(0) | 0 |
| VL(1) | −1 |
| VL(2) | −2 |
| VL(3) | −3 |
| VR(1) | +1 |
| VR(2) | +2 |
| VR(3) | +3 |
| P | 0 |

The steps 102–114 in FIG. 3 illustrate a typical decoding series of steps. First, a color unit in the reference line is accumulated and a codeword is decoded to generate a displacement value of Y. The accumulated run length of the reference line is combined with Y to generate the accumulated run length for the coding line. This value is stored in the P1 register. The run length of the color unit in the coding line is then formed by the difference between the P1 and P2 registers and stored in the RL register. This value in the RL register is released as an output signal. The total run length register for the coding line is updated, the RL register is reset and the value in the P1 register is transferred to the P2 register since the color unit represented by the value in the P1 register has been released as an output signal.

The decision step 116 determines whether the current color picture element in the coding line is ahead of the accumulated run length of the referenced color change picture element in the reference line, i.e., whether $a_1$ is ahead of $b_1$. If the coding line is ahead of the reference line, then the steps 117, 118 move the decoding process to the next color unit in the reference line. The steps 119 and 120 determine whether the new supposed $b_0$ is in the same picture element position as the new $a_0$. This coding is not possible by the modified READ coding procedure since the $b_1$ picture element must be after the $a_0$ element and of opposite color, by definition. If such is not the case, the coding process returns back to the step 104. However, if such is the case, the steps 121 $\propto$ 124 accumulate the next two color units in the reference line. Thus the color flag, which indicates the color of color unit in the coding line, need not be changed. The steps 125-131 generate the run length of the coding line color unit using these twice accumulated color units in the reference line. The steps 132-135 invert the color flag and update the TR, RL and P2 registers.

The steps 136, 137 ask the question whether the previous reference line color change picture element, which has its accumulated run length stored in the R2 register, may be used as the reference picture element for the next color change picture element in the coding line. If so, the steps 138-144 perform the decoding function. Note that the P1 register is the sum of the Y value and the value in the R2 register. Compare step 140 with the step 106, for example. Similarly the steps 153-158 perform that function for vertical mode coded signals from the branch beginning with the step 150.

The P, or pass, mode decoded signals are handled by the steps 171-178. The series of steps assures that the correct picture element in the reference line is selected as the $a_0$ reference element. The steps 163-170 also perform the same P mode coding function. However, in this case the value in the R2 register, rather than R1 register is used as the starting point.

The processing of the H mode coded signals are performed by the steps 179-190. An H mode flag is set to zero so that by the condition in the step 187, the decoded run lengths of the coding line color units are generated twice, as required by the coding process. After the H mode steps are performed twice the decoding process exits through the steps 188 and 189.

Thus, this accumulated run length, or the position of the color change picture element in the coding line, is typically generated and stored in the P1 register, e.g., as in the step 106. The P2 register stores the accumulated run length of the previous color change picture element in the coding line so that the difference between the values in the P1 and P2 registers is the run length of the color unit between the present color change picture element and the previous color change picture element in the coding line.

EXAMPLES OF THE PRESENT DECODING METHOD

The examples in FIGS. 2A, 2B and 2C are decoded by the present decoding method as an illustration of its detailed operation. From the sequence of codewords for each coding line 201, 203 and 205, the run lengths and color of each color unit in the coding line is obtained.

To start the decoding process, the initialization step 101 is performed. All the registers are cleared and the color flag set to indicate a white color unit. By convention it is assumed that each scan line begins with a white color unit. After steps 102 and 103, both the R1 and R2 registers are zero. Even though the R1 register has been accumulated, the first white color unit in the reference line 200 in FIG. 2A has a run length of zero because the first picture element in the reference line 200 is black. By step 104 the codeword "V(0)" is decoded and the value for Y is zero.

By the decision step 105, it is determined that the vertical mode is detected. The value of the R1 register is added to Y and stored in the P1 register. Since both the values for R1 and Y are zero the P1 value is also zero. After the two error checking steps 107, 108 are performed, the calculation of the run length of the color unit in the coding line by step 109 is performed. The RL, P1 and P2 registers are all zero and therefore the resulting value stored in the RL register 0. The step 110 results in an output run length signal of 0.

The color flag is inverted to black by the step 111. The total run length is accumulated by step 112. In this case, the value in the TR register remains 0. The RL register is reset by the step 113 and the value in the P1 register is transferred to the P2 register by the step 114.

The decision step 116 asks whether the decoded value of Y is greater than 0. Since it was equal to 0, the decoding process moves to the 150. Since both R2 and the TR registers are 0, the R3 register contains a 0 value. Therefore the determination in the step 151 returns the decoding process back to the step 102.

By step 103 a value of 3 for the black color unit in positions 1-3 in the reference line 200 is accumulated and stored in the R1 register. The next codeword "VL(1)" is decoded to generate a Y displacement value of −1. This is the vertical mode so the step 106 leads to a value of 2 to be stored in the P1 register. The R1 register contains 3 and Y is a value of −1. Afterr the error checking steps 107, 108, the run length determination step 109 has a value of 2 stored in the RL register, since the RL and P2 registers had contained zero. The step 110 has a run length signal of 2 generated as output under a black color flag. This matches the white color unit in the positions 1-2 in the coding line 201.

The color flag by the step 111 is inverted to white and the TR register is updated to (0+2=) 2. The RL register is reset by the step 113 and a value of 2 is transferred to the P2 register from the P1 register. Since the value of Y is not greater than 0, the step 150 is performed. The R2 register contains 0 and the TR register value is 2. The decision step 151 thus turns the decoding process back to the step 102. A value of 3 is transferred to the R2 register and the next color unit in the reference line 200 is accumulated. This color unit at the fourth position has a run length of 1, therefore the register R1 is loaded with a value of 4. The next codeword "V(0)" is decoded. It is a vertical mode codeword. The P1 register is thus set to (4+0=) 4. Since P is equal to 4 and P2 equal to 2, the RL register is loaded with a value of 2 by the step 109. Thus a run length of 2 for a white color unit is generated.

The color flag is inverted to black by the step 111 and the TR register updated to a value of 4 (2+2). The RL register is reset and the P2 register set to the value of the P1 register, 4. Again the steps 116, 150 and 151 lead back to the step 102. The color unit in positions 5-6 in the reference line 200 has a run length of 2. Therefore the step 102 has a value of 4 placed into in the R2 register and the step 103 a value of 6 into the R1 register. The next codeword is "VR(1)," a vertical codeword leading to a value of +1 for Y. The step 106 has a value of (6+1=) 7 stored in the P1 register. A value of 3 is generated for the RL register, since the values for the P1 and P2 registers are 7 and 4 respectively. Thus the step 110 generates an output signal indicating a black color unit of run length 3. The color flag is inverted to white by the step 111 and TR register updated to a value of 7. The RL register is reset and the P2 register updated to a value of 7. Since Y is equal to a value of +1, the coding process continues on to the step 117, by which the R2 register is loaded with a value of 6 from the R1 register. The next color unit in the reference line 200 is accumulated and the R1 register loaded with a value of 8. The TR register contains a value of 7 so the P1 register is loaded with a value of 1 by the step 119. Since the P1 value is not equal to 0 in the step 120, the coding process returns to the step 104. The next coding word is "P" for the pass mode so the coding process through the steps 104, 105, 171 moves to the step 172. The P1 register is loaded with the value of 8, since the R1 value is 8 and the Y value in a pass mode is 0. By the step 173 the RL register is loaded with a value of $(8-7=)$ 1. The R2 register is updated to a value of 8 and step 174 and the R1 register is updated to a value of 10 by the accumulation of the next color unit in positions 9, 10 in the reference line 200 in the step 175. The value of 8 is transferred from the P1 register to the P2 register and the new value of 10 is transferred from the R1 register to the P1 register by the step 177. The step 178 calculates the run length, which in the present case is 3 since the RL register contains the value of 1 and the difference between the P1 and P2 registers is 2. However, the value in the RL register is not released as output signals. Rather, the decoding process returns to the step 102.

The R2 register is updated to a value of 10 and the next color unit in positions 11-12 in the reference line 200 is once more accumulated. This accumulated run length value for the change picture element in the position 13 yields a value of 12 for the R1 register. The next codeword "VL(1)," a vertical codeword is decoded. Y has a value of $-1$. Therefore, by the step 106 the P1 register is loaded with a value of $(12-1=)$ 11. Since the RL register already contains a value of 3 and the P1 and P2 register contain the values 11 and 10 respectively, the RL register is loaded with a value of 4. This run is released as output by the step 110 under a white color flag.

The color flag is again inverted to black. By this iterative process the coding line 201 in FIG. 2A in reconstructed. The two black picture elements, 3 white picture elements and so forth are generated by this decoding method.

FIG. 2B illustrates how the present coding method generates the run lengths of color units in the coding line 203 with respect to the reference line 202. In this example pass mode signals and horizontal mode signals are received.

As stated previously, both the coding line 203 and the reference line 202 are assumed to start with a white color unit. After the initialization step 101 the first color unit in the reference line 202 is accumulated by the step 103. At this stage the step 102 has no effect. The first codeword "P," indicating the pass mode is decoded. Thus the coding process moves to the step 172. Since Y has zero value in the pass mode and the R1 register at this point is 0, the P1 register is loaded with a value of 0. For the same reasons, the RL and R2 registers remain 0 by the steps 173, 174. By the step 175 the first black color unit in the reference line 202 is accumulated and the R1 register is loaded with a value of 2. The step 176 at this point is a null operation and the P1 register is loaded with a value of $(2+0=)$ 2. By the step 178 the RL register is loaded with a value of 2 and the coding process returns to the step 102.

The R2 register is updated with a value of 2 and the next white color unit in positions 3-4 of the reference line 202 is accumulated. The value in the R1 register by the step 103 is now 4. The next codeword is "V(0)." Since that is a vertical mode codeword, the decoding process proceeds to the step 106 by which the P1 register is loaded with a value of 4. Since the RL register at this point contains 0 and the P2 register is similar, the value in the P1 register is transferred to RL by the step 109. This value 4 is sent as the output signals under the original starting white color flag.

The color flag is now inverted to black by the step 111 and the TR register is updated to a value of 4. The RL register is reset and the P2 register is set to a value of 4. Since Y is equal to 0, the coding process moves to the step 150. Both the R2 and TR registers contain the value of 4 and the coding process returns to the step 102 by the decision step 151. The R2 register is updated. In this case it remains unchanged and the R1 register loaded with the value of 5 with the accumulation of the black color unit occupying the fifth picture element position in the reference line 202. The codeword "VR(2)," a vertical codeword generates a value of $+2$ for Y by the step 104. This leads to a value of $(5+2=)$ 7 for the P1 register by a step 106. Since the P2 register contains a value of 4 the RL register is loaded with a value of $(0+(7-4)=)$ 3. The step 110 therefore yields a run length signal of 3 for the second color unit in the coding line 203 under a black color flag.

The color flag is now inverted to white and the TR register is updated to a value of 7, since the previous TR value was 4. The RL register is reset and the P2 register is updated to the value of 7 in the P1 register by the step 114. Since Y was equal to $+2$ under the "VR(2)" code word, the coding process continues to the step 117. R2 is updated to the value of 5 in the R1 register and the next color unit in the reference line 202 is accumulated. The next color unit stretches from the sixth position to the fifteenth position in the reference line 202 so a value of 15 is stored in the R1 register by the step 118. Since the TR register contains a value of 7 the P1 register is loaded with a value of 8. By the decision step 120 the coding process returns to the step 104 by which the next coding word is decoded. In this case the coding word "H" indicates the horizontal mode and that the following two code words are color unit run length code words in the one-dimensional mode. "MH(2)" and "MH(4)" indicate the run lengths of 2 and 4 for the next two color units in the coding line 203. Therefore the coding procedure proceeds through the steps 105, 171 and 179. The step 180 indicates that the first run length codeword is decoded and the run length stored in the P1 register. A value of 2 is stored. The RL register originally being 0, it is now loaded with a value by the step 181. This value of 2 under the white color flag is released as output signals corresponding to the white color unit in positions 8-9 in the coding line 203.

Still remaining in the color steps for the horizontal mode, the color flag is inverted to black by the step 183. The step 184 adds the value of 7 in the TR register to the 2 value in the RL register and stores the sum 9 in the TR register. The RL register is reset and the value in the TR register is loaded to the P2 register, which is now 9. At this point the step 187 asks whether the H mode flag is set to 1, which indicates that the horizontal decoding procedure is over. The H mode flag is not 1 so the coding procedure returns to the step 180 after the H mode flag is set to 1.

The second run length codeword is decoded in the step 180 and the value of 4 is stored in the P1 register. Since the RL register had been previously rest, the step 181 leads to a value of 4 in the RL register. Thus the output step 182 generates a value of 4 under the black color flag. This corresponds to the black color unit in positions 10-13 in the coding line 203.

The color flag is inverted once again by the step 183 and the TR register updated to a value (9+4=) 13. The RL register is reset.

Since the H mode flag had been equal to 1, the decoding procedure exits the H mode loop. The H mode flag is set equal to 0 for the next horizontal mode decoding by the step 188. The R2 register is loaded with a value of 15 from the R1 register by the step 189 and the decoding procedure proceeds to the step 136. Since the R2 register contains the value 15 and the TR register contains the value 13, the steps 136 and 137 lead to the decoding of the next coding word by the step 138. This coding word is "VR(1)." Since it is in the vertical mode and the value of Y is +1, the P1 register is loaded with a value (15+1=) 16. The P2 register contains the value 13 by the operation of the previous step 186 and a value of 3 is loaded into the RL register. Since the color flag is white, the output step 144 indicates a white color unit of 3 picture elements in length. In this manner the present method will decode the coding line 203 completely.

FIG. 1C illustrates some other intricacies of the coding and decoding procedure in the CCITT T.4 recommended standard.

After the start and initialization step 101 the reference line 204 has its first color unit run length accumulated. As discussed previously, the first run length is assumed to be white. As is evident in FIG. 2C the first color unit in the reference line 204 is white and has a run length of 2. The first codeword "VL(1)" is decoded to generate a value of −1 for Y. Since the codeword is for the vertical mode, the P1 register is loaded with the sum of the values in the R1 register and Y. A value of (2−1=) 1 is loaded into the P1 register by the step 106. Since the R1 and P2 registers are 0, the step 104 has the RL register loaded with a value of 1. Thus, the first decoded color unit has a run length of 1 under the white color flag.

Steps 112, 113 and 114 have the TR, RL and P2 registers loaded with the values 1, 0, and 2 respectively. Since Y was equal to a −1 the decision step 106 leads to the step 105. Thus, the R3 register is loaded with the value (0−1=) −1 and based on this condition, the decision step 151 leads the coding process back to the step 102. The R2 register is loaded with a value of 2 and the next color unit in the reference line 204 has its run length accumulated into the R1 register. The R1 register now contains a value of 6. By the step 104 the codeword "VL(3)" is decoded to obtain a displacement value of −3 for Y. The P1 register is thus (6−3=) 3 by the step 106. Since at this point the RL register is 0 and the P2 register contains a value of 1, the step 109 has the RL register loaded with a value of 2. Therefore, by the step 110 the next color unit is black with a run length of 2.

The color flag is inverted to white and the next 3 steps have the TR, RL and P2 registers loaded with the values 3, 0 and 3.

Since Y is less than 0, the step 150 leads to the value of −1 since the R1 register contains a value of 2 and the TR register 3. The conditions step 151 leads to the step 102. The R2 register is updated to a value 6 from the R1 register and the next color unit in positions 7-8 in the reference line 204 has its run length of 2 accumulated. The R1 register contains the value 8 at this point. The next codeword "VL(2)," another vertical mode codeword generates a value of −2 for Y. The step 106 leads to a value of (8−2=) 6 for the P1 register. Since the P2 register contains a value of 3 and the RL register is presently 0, the step 109 has a value of 3 loaded into the RL register. This value is released as the run length of a third color unit in the coding line 205 under the white color flag.

The color flag is inverted to black once again under the step 111. The TR register is updated to a value of 6 and the RL register is reset. The P2 register is updated to a value of 6. Since both the R2 and TR registers contain the same value the decoding process returns to the step 102.

The next color unit in the ninth and tenth positions in the reference line 204 is accumulated after the R2 register is updated to a value of 8. The R1 register now contains a value of 10. The next codeword "VL(3)" is decoded. Since Y is now a value of −3 the step 106 leads to a value of (10−3=) 3 for the P1 register. Thus the RL register is loaded with a value of 1, since the P2 register has a value of 6. This run length is released under the black color flag by the step 110.

The color flag is inverted to white once more. This TR register is updated to a value of 7 and the RL register is reset to 0. The P1 register transfers its value of 7 to the P2 register. Since Y was equal to −3, the step 150 must be performed. The R2 register contains a value of 8 and the TR register contains a value of 7. Therefore the decision step 151 leads to decoding step 152. The next codeword is "VR(1)." Y is equal to +1. Since this is a V mode codeword, the Y value is added to the R2 register value for a sume of (8+1=) 9. Thus the value 9 is stored in the P1 register by the step 154. By the step 157 the RL register is loaded with a value of 2, since the value stured in the P2 register is 7. Thus a run length of 2 under the white color flag is generated by the output step 158.

The color flag is inverted to black under the step 159 and the TR register is updated to a value of 9. The RL register is reset by the step 161 and the P2 register receives the contents of the P1 register for a value of 9 by the step 162. Since Y was equal to +1, the decision step 162 leads the decoding sequence to the step 119. The R1 register contains a value of 10 and the TR register a value of 9 so the decision step 120 leads the decoding process back to the step 104, by which the next codeword "V(0)" is decoded. Since the R1 register contains a value of 10 and a Y value is 0, the P1 register contains 10. Since the P2 register has a value of 9, the step 109 has the RL register loaded with a value of 1. This value is released as the run length of the next color unit in the coding line 205 under the black color flag, corresponding to the black color unit in picture element position 10.

The color flag is inverted to white once more and the coding process continues.

THE DECODING DEVICE OF THE PRESENT INVENTION

Figure 4:
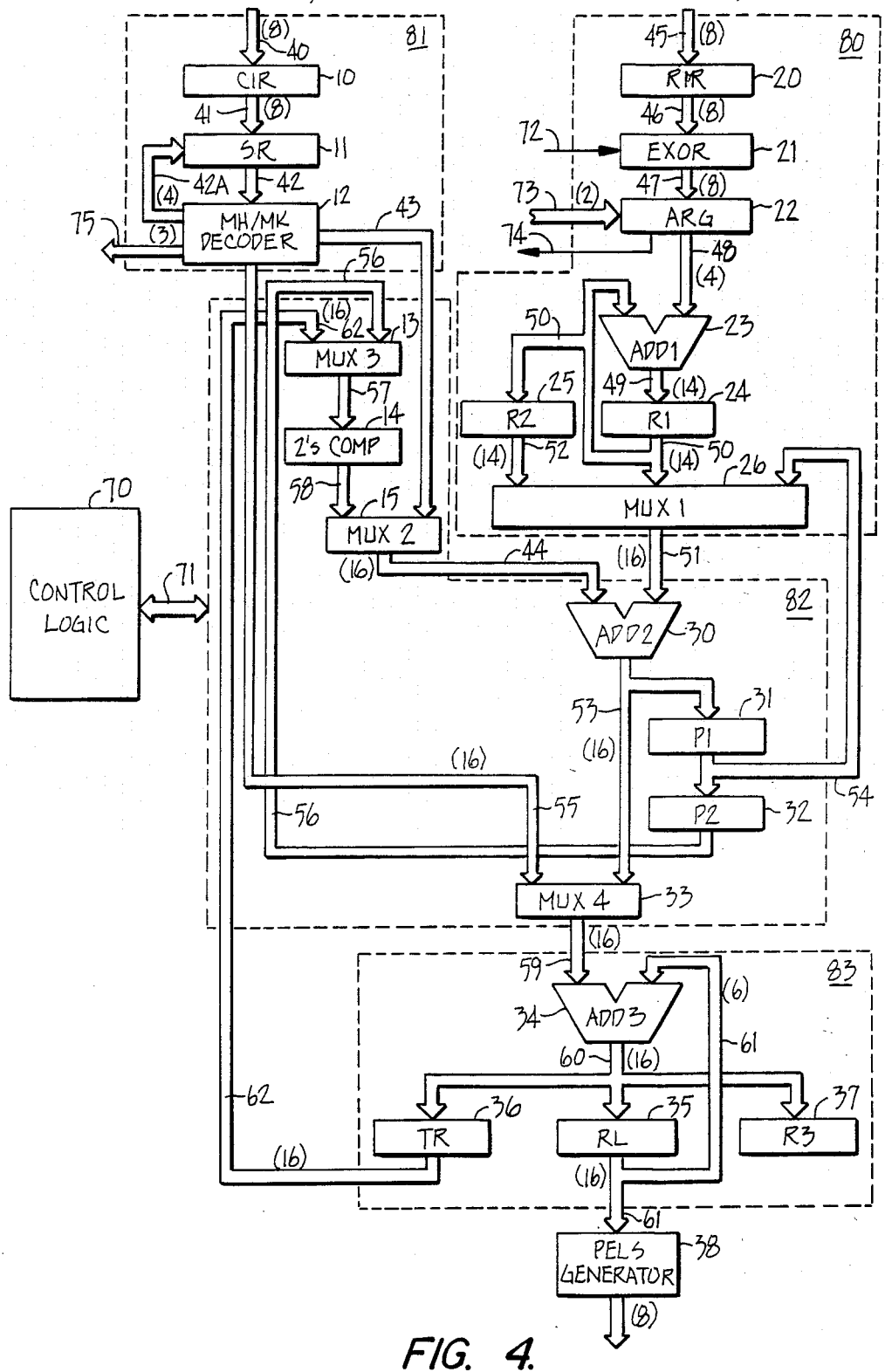
FIG. 4 illustrates the architecture of the decoding device of the present invention.

A device specially adapted for decoding facsimile signals which have been coded in accordance with two-dimensional facsimile codes is shown in FIG. 4.

This embodiment of the device has a reference line processing unit 80 which generates the accumulated run length of each color unit in the reference line, a coding line processing unit 81 which generates displacement values from coded vertical mode signals and run length values of color units from coded horizontal mode signals, and a combining unit having two parts. A first combining unit part 82 receives signal values from the reference line processing unit 80 and the coding line processing unit 81 to generate the accumulated run lengths of color units in the coding line. The second combining unit 83 is coupled to the first combining unit 82 and generates the run length of the color units in the coding line by determining the difference in the accumulated run lengths of color units in the coding line. The device also has a control logic unit 70 which controls the operation of the device in accordance with the decoding method discussed above.

The control logic unit 70 communicates with the rest of the device through control lines symbolized in FIG. 4 by a bidirectional arrow 71. Where a particular element of the device is discussed in detail below, the individual control lines for that element are also explained. However, one skilled in the art may also deduce the nature and operation of the control lines not shown from the explanation below.

Furthermore, the operation depends upon the status of the registers, such as R1 and R2, for the election of coding branches. The particular logic circuits used to indicate the status of registers to the control logic 600 are not shown since it is well known how to design and connect such circuits between registers and a control logic unit.

Additionally, for convenient notation, there are many data paths in the drawings near which there are numbers enclosed by parentheses. These enclosed numbers indicate the width of a data path, or the number of signals which can be transferred in parallel on the data path.

The reference line processing unit 80 has a reference line input register 20 which receives by a data path 45 the decoded picture element data of the reference line. The two-dimensional coding procedure requires that the coding line be decoded with respect to a line which has already been decoded. Thus, the picture data which is loaded into the input register 20 is from a line memory (not shown) which stores the decoded data of a previous coding line. Generally the reference line is the scan line which immediately proceeds the present coding line. The reference line data is loaded in parallel by 8-bit data blocks by a signal path 45.

The input register 20 retains a data block and also transmits its contents in parallel to an EXCLUSIVE OR gate 21. The EXCLUSIVE OR gate 21 alternately passes and inverts the data signals in the register 20 under the control of the signal on a color flag line 72 from the control logic 70. The EXCLUSIVE OR gate 21 performs its function in parallel, and the passed and inverted data is received by an accumulated run length generator block 22 by an 8-bit wide path 47.

The accumulated run length generator block 22 sequentially generates the run length of each color unit within the data block held in the register 20. Each run length is generated in one clock cycle. For example, if all of the picture elements in the data block in the register 20 are of one color, the generator block 22 generates a binary signal of "1000" or 8 in one clock cycle. If there are three color units in the data block in the register 20, then three clock cycles will be required. The accumulated run length generator block 22 is controlled by the control logic unit 70 by signals on the control lines 73. The control logic 70 also is notified along a control line 74 when the accumulated run length generator block 22 has generated the run length of the last color unit in the data block 20. The control logic 70 then loads the input register 20 with the next data block of the reference line. The signal on the color flag, however, remains unchanged and the run length of the first color unit in the new data block is generated by the block 22. If this color unit has the same color as the previous color unit it will be added to the accumulated run length value stored in a register 24.

The register 24 stores the accumulated run lengths of color units in the reference line. It is identified as the R1 register in the decoding method given previously. The accumulation of run lengths of color units in the reference line is performed by an adder 23, which receives the individual run lengths of color units within a data block from the accumulated run length register 22 by a 4-bit wide data path 48. The R1 register 24 contains the accumulated run lengths of previous color units. By a 14-bit wide data path 50 the previously accumulated run length signals are fed back into another set of input terminals of the adder 23. The adder 23 logically combines the two sets of signals on the data paths 48, 50 and the signals representing the summed value is stored in the R1 register 24 by a data path 49.

When the accumulated run length generator block 22 has processed the final color unit in the data block held in the register 20, the control logic 70 causes the next data block to be loaded into the register 20 and the first color unit of the data block has its run length generated. If the color is the same as the last color unit in the previous data block, the operation of the adder 23 is such that the run length of the color unit in the next data block is also added to the value in the register 24. In this manner the accumulated run lengths of color units, or color change picture elements stated differently, are independent of data blocks.

Also connected to the R1 register 24 is an R2 register 25 by the data path 50. As explained previously, the register 25 also holds accumulated run lengths for the reference line.

While the reference line processing unit 80 is generating the run lengths of color units in the reference line, the coding line processing unit 81 receives the coded data of the coding line from a line memory (not shown) by an 8-bit wide data path 40. This data is received in parallel and stored in a coding line input register 10. The data in the input register 10 is then loaded into a shift register 11 by a data path 41. The shift register 11 with a decoder 12 generates the Y displacement value discussed previously for the decoding method. The Y value appears on the signal path 43.

The shift register 11 is 20 bits wide and is loaded from the input register 10 by an 8-bit signal path 41. These data enter the 8 uppermost bit places in the shift register 11. For convenience it is assumed that these places are located on the left of the register 11. The shift register communicates the data signals in the 14 bottommost bit place positions of the right of the shift register 11.

The decoder 12 identifies the unique codeword signals, "V(0)," "VL(2)," and "MH(10)," for example. These codeword signals can be set up to 14 bits long. After idenfitying a unique codeword starting from the right in the 14-bit signal held in the shift register 11, the decoder 12 generates the corresponding Y displacement value on the path 43 for vertical mode signals or color unit run length signals on the path 55 for horizontal mode signals.

The decoder 12 also transmits signals indicating the length of the identified codeword to the shift register 11 by a data path 42A. In response to these signals, the shift register 11 shifts out that number of the bottommost data signals. The remaining data in the shift register 11 is shifted down, or to the right, for next operation by the decoder 12. Additionally the shift register 11 communicates to the input register 10 when the shifting operation has freed the 8 uppermost bit places in the shift register 11. The next 8 bits of data i then loaded into the shift register 11 from the coding line input register 10 to keep the shift register 11 filled.

The decoder 12 also informs the control logic 70 of the mode of each decoded codeword by control lines 75. Each one of the three control lines 75 indicates either the vertical, pass or horizontal modes.

Implementation of the decoder 12, and the control logic unit 70, is in the form of a ROM (Read Only Memory) or a PLA (Programmed Logic Array). It is well known in the art how to set these devices.

The first part 82 of the logic combining unit has an adder 30, which receives the contents of the R1 register 24 or the R2 register 25 by a multiplexer 26 and a signal path 51. The adder 30 at its other input leg can receive the decoded value Y through a multiplexer 15 and a signal path 44. The adder 30 performs the function of summing the accumulated run length in the reference line with the decoded Y value. This generates the accumulated run length of color units in the coding line for vertical mode signals.

These values are stored in a register 31. This register is a P1 register mentioned previously. A second register 32, the P2 register, accepts P1 register signals for storage.

When the difference in the two registers 31, 32 is required, the signals in the P1 register 31 are fed back to the adder 30 on a feedback path 54, the multiplexer 26 and the data path 51. The signals in the P2 register 32 are fed back on a path 56 through a multiplexer 13 to a TWOS COMPLEMENT logic block 14. The logic block forms the modification of the signals so that a subtraction operation may be performed by the adder 30. The modified signals from the block 14 continue to the adder 30 through a data path 58, the multiplexer 15 and a data path 44.

The second part 83 of the logic combining unit has an adder 34 with three registers 35–37 connected to the adder 34 output terminal by a data path 60. The first register 35 is identified as the RL register in the previously explained decoding method. The RL register 35 contains the run length of each color unit in the coding line and is coupled to a picture element generator 38 by a data path 61. In vertical mode decoding the value for the RL register 35 is generated by the operation "RL=RL+(P1−P2)." The adder 30 performs the subtraction operation between the P1 and P2 registers 31, 32. The addition operation between the values stored in the RL register 35 and the value of the subtraction operation between the P1, P2 registers is performed by the adder 34. The RL register value is fed back to the adder 34 by a data path 61. The difference between the P1 and P2 registers from the adder 30 passes through the data path 53, the multiplexer 33 and data path 59.

In the horizontal mode, where the run lengths of individual color units in the coding line are decoded directly, these run length signals pass unmodified from the decoder 12 through the path 55 through the multiplexer 33, the signal path 59, adder 34 and finally the data path 60 to the RL register 35.

The TR register contains the total run length of color units which have been decoded for certain test operations, such as the step 107 in FIG. 2, the TR register 36 is coupled to the adder 30 by feedback path 62. In this manner the test conditions may be formed.

The third register 37, the R3 register, serves as an alternative storage register for the decoding method.

The individual operation and design of registers, EXCLUSIVE OR and TWOS COMPLEMENT logic blocks, adders and multiplexers used in the present device are well known in the art. The operation and details of the remaining accumulated run length generator block 22 in FIG. 4 are illustrated in FIG. 5A and following drawings.

Figure 5A:
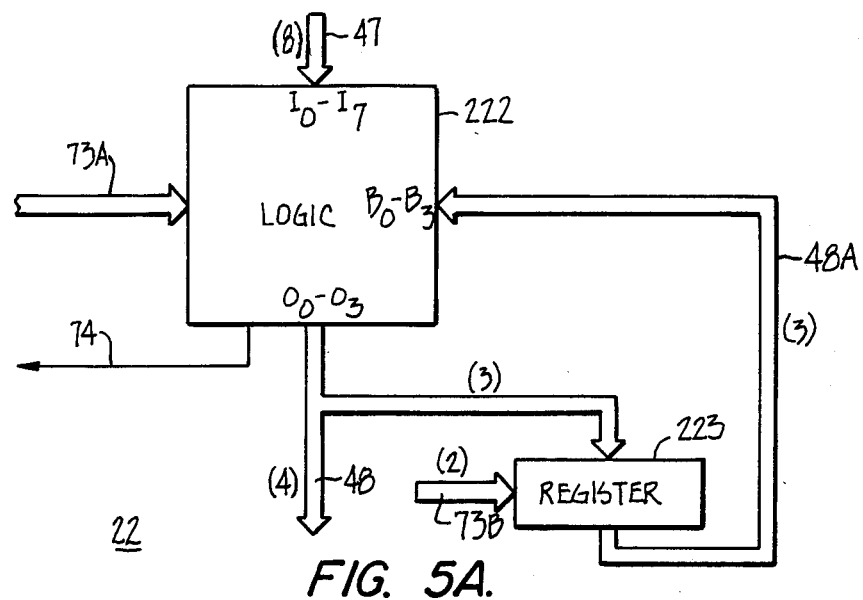
FIG. 5A shows the structure of the accumulated run length generator block in FIG. 4.

In FIG. 5A the accumulated run length generator block 22 is shown divided into a logic circuit 222 and a register 223. The logic circuit 222 receives in parallel the signals $I_0$–$I_7$ from the EXCLUSIVE OR gate 21 on the data path 47. On each clock cycle the logic circuit 222 generates the accumulated run length in binary of the color units in the data block represented by the $I_0$–$I_7$ signals. This is shown by an example in FIG. 5B. These output signals are carried by the $O_0$–$O_3$ output lines, three of which also go to the input terminals of the register 223. The $O_0$–$O_2$ signals are held by the register 223 and fed back into the logic circuit 222.

A control line 74 simply connected to the $O_3$ output line carries a signal to inform the control logic unit 70 when the last color unit in a data block is being processed. The control lines 73A control the timing and operation of the logic circuit 222. Similarly, the load and clear functions of the register 223 are controlled by signals of the double control lines 73B.

Figure 5B:
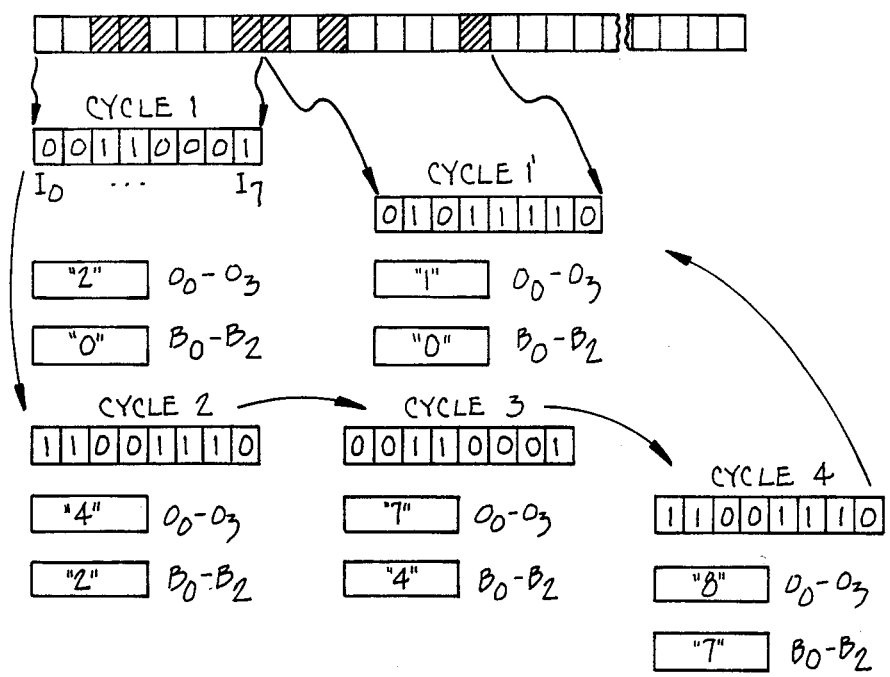
FIG. 5B illustrates the operation at the accumulated run length generator block.

When the control logic unit 70 receives a signal on the line 74, the color flag signal on the line 72 is not inverted. Rather, the next data block is loaded into the register 20 and the results from the accumulated run length generator block 22 are combined by the adder 23 with the accumulated run length stored in the R1 register 24 by the feedback path 50. If the first color unit in the present data block has a different color from that of the last color unit in the previous data block, the R1 value remains unchanged. A zero is added to the R1 value. On the other hand, if the two colors are the same, then the R1 value increases by the number of picture elements in the first color circuit of the loaded data block. Cycles 4 and 1 in FIG. 5B illustrate the operation of the accumulated run length generator block 120 at the transition point between the two data blocks.

Details of the circuit 222 are shown in FIG. 6. This circuit 222 has two ROMS 230, 231 which are interconnected by OR gates 252–257 and AND gates 241–247. The ROMs 230, 231 are enabled by a signal on the control line 73A.

The ROM 230 receives as input signals the $B_0$–$B_2$ signals on the feedback path 48A shown in FIG. 5A. The signals correspond to the accumulated run length of the previous color unit, which is stored in the register 223. The ROM 230, set in accordance with the input-output table in FIG. 7 and responsive to these input signals $B_0$–$B_2$, generates signals which form a mask for the input signals $I_0$–$I_7$.

When the register 223 is empty, i.e., "0" the output signals $G_1$–$G_7$ of the ROM 230 enables all of the AND gates 241–247 to be able to generate a "1" output signal. A ONE input signal on an input terminal will generate a ONE output signal on that order output terminal and higher. For example, if $I_3$ is "1," then $A_3$–$A_7$ are "1." When the register 223 contains a number, say, 3, the output signals that $A_0$–$A_2$ signals are ZERO. The lowest order appearing ONE from the ROM 230 ensures that remaining output signals $I_3$-$I_7$ will cause a "1" signal on that order output and higher.

For cycle 1 of the example in FIG. 5B, each of the AND gates 241–247 has at least one input terminal with a "1" signal from the ROM 230. The input signals $I_0$-$I_7$, "00110001," cause the output signals of the OR gates 251–257 and the AND gates 241–247 to be "0011111". The output signals $A_0$-$A_7$ are thus "00111111" and "0011111" respectively.

The signals $A_0$-$A_7$ are received by the ROM 231. As illustrated by the input-output table in FIG. 7, the ROM 231 is set so that the number of ZEROs in the input signals $A_0$-$A_7$ appear in binary on the output signals $O_0$-$O_3$. In the present example, $O_0$-$O_3$ equal "0010." $O_0$ is "0", O is "1", $O_2$ is "0" and $O_3$ is "0" in the reverse-ordered binary output table in FIG. 8.

In FIG. 5B, cycle 2, the register 223 now contains the value of "2" or "0010" in binary. Since the path 48A carries the three lower order bits back to the circuit 222, the ROM 230 receives "010" as input signals $B_0$-$B_2$. This combination of input signals, by reference to the FIG. 7 table, indicates that the first two output signals $G_1$, $G_2$ are "0," while the remaining output signals $G_3$-$G_7$ are "1." At the same time the EXCLUSIVE OR block 21 inverts all of the signals in the input register 20 so that the second color unit, originally black, appears as white or "0" signals on $I_2$ and $I_3$. Since input signal $I_4$ is a "1," all of the output signals for OR gates 254–257 are "1," while the output signals for OR gates 251–253 are "0." Therefore the output signals for the AND gates 241–244 are "0" and the remaining AND gates 245–247 are "1." The output signals $A_0$-$A_3$ are "0" and the signals $A_4$-$A_7$ are "1." FIG. 8 implies that the output signals $O_0$-$O_3$ are "0100", i.e., there are four zeros as inputs to the ROM 231. In this manner the circuit shown in FIG. 6 generates the accumulated run lengths of color units within a data block by a ratio ONES and ZEROS.

Figure 9:
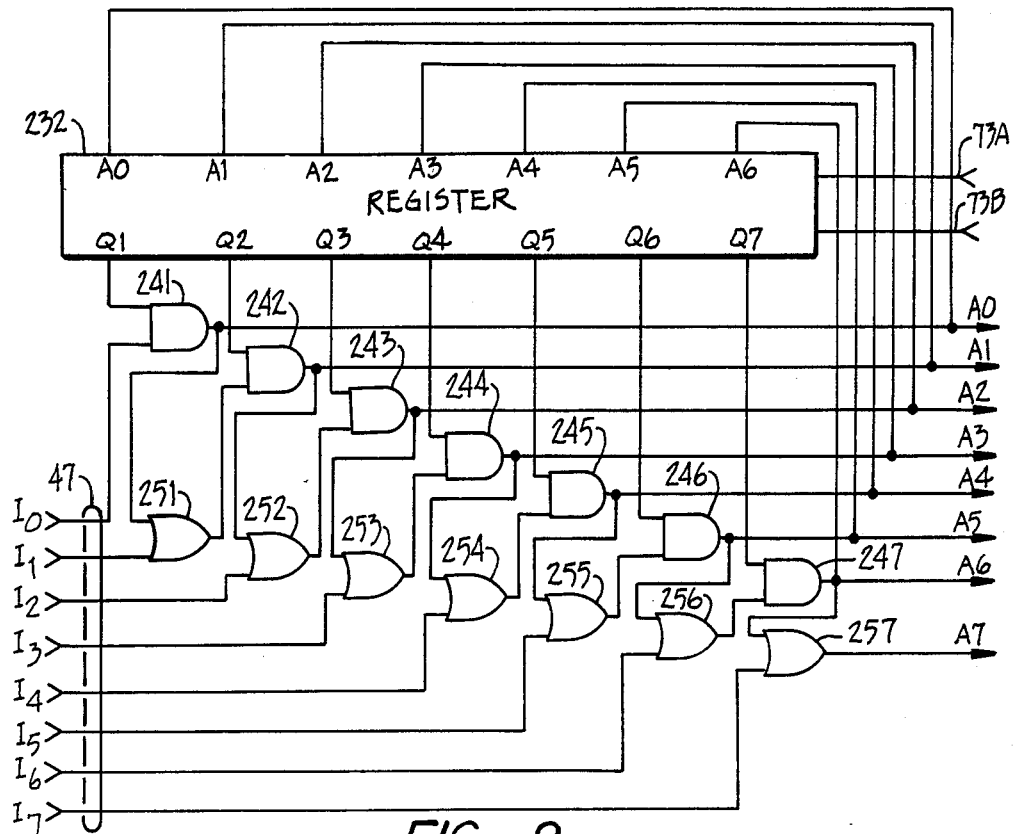
FIG. 9 illustrates the details of an alternative embodiment of one part of the circuit shown in FIG. 6.

An alternative to some of the circuitry shown in FIG. 6 is illustrated in FIG. 9 in which the ROM 230 has been replaced by a register 232. The register 232 does not require feedback signals from the register 223. Instead, the register 232 takes its input signals directly from the AND gates 241–247. The input signals $A_0$-$A_6$ into the register 132 in one cycle appear as respective register 232 output signals $Q_1$-$Q_7$ in the next cycle. A signal on the control line 73, enables the leading of the $A_0$-$A_7$ signals into the register 232 and the appearance as $Q_1$-$Q_7$ output signals of the previous $A_0$-$A_7$ signals. A signal on the line 622B clears the register 232.

Figure 10:
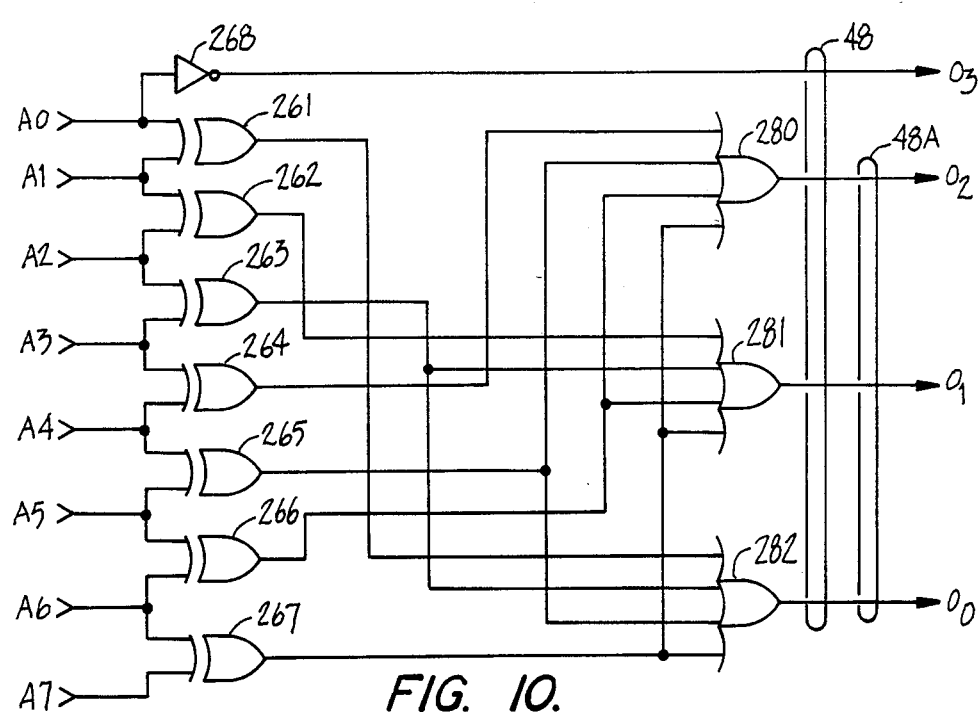
FIG. 10 shows the details of an alternative embodiment of another part of the circuit shown in FIG. 6.

FIG. 10 shows a replacement for the ROM 231 in FIG. 6. The circuit in FIG. 10 uses combinatorial logic by the use of the EXCLUSIVE OR gates 261–267 and an inverter 268. The output terminals of the EXCLUSIVE OR gates 261–267 form the input terminals of the OR gates 280–285 which generate the output signals $O_0$-$O_3$. The $O_3$ output signal is generated by the inverter 168.

Although the foregoing invention has been described with respect to particular embodiments, these embodiments are not intended to limit the invention, but rather to clarify and explain it. The scope of the invention is to be determined from the appended claims.

We claim:

1. A facsimile device for decoding the positions of color change picture elements in a coding line of digitized picture data coded in a sequence of codewords with respect to the position of change picture elements in a reference line of digitized picture data, said device comprising a control logic for controlling the operations of said device;

first means, coupled to said control logic and responsive to said reference line picture data, for sequentially generating in parallel the accumulated run lengths of each color change picture element in said reference line;

second means, coupled to said control logic and responsive to said codewords, for generating displacement values;

third means, coupled to said control logic, first and second means, for combining said reference line accumulated run lengths and said displacement values to sequentially generate the accumulated run lengths of change picture elements in said coding line; and fourth means, coupled to said control logic and said third means, for generating the difference in accumulated run lengths for consecutive color change picture elements in said coding line to generate the run lengths of color units between said consecutive color change picture elements;

whereby said generated run lengths are decoded from said codeword sequence.

2. A facsimile device as in claim 1 wherein said first means receives said reference line picture data in data blocks and generates in a single clock cycle the accumulated run length of a color change picture element in a data block provided the previous color change picture element is also in said data block.

3. A facsimile device as in claim 2 wherein said first means comprises a generator for sequentially generating the run lengths of color units of change picture elements in said reference line, means coupled to said generator for combining the run length of a color unit with the run lengths of previous color units; and whereby the accumulated run length of the change picture element beginning the next color unit is generated.

4. A facsimile device as in claim 3 wherein said combining means comprising an adder having a first input terminal coupled to said generator;

a register having an input terminal and an output terminal, said output terminal coupled to a second input terminal of said adder and said input terminal coupled to an output terminal of said adder; and whereby said register sequentially holds the accumulated run lengths of said change picture elements.

5. A facsimile device as in claim 3 wherein for a color unit in a plurality of blocks of picture data, said generating means sequentially generates the partial run lengths of said color unit located in each picture data block of said plurality of said combining means combines said partial run lengths, whereby the accumulated run length of the change picture element beginning the next color unit is generated.

6. A facsimile device as in claim 5 wherein said first means comprises an input register for sequentially holding a block of picture data; and a logic block coupled to said input register for EXCLUSIVE ORing each signal of said data block in parallel.

7. A facsimile device as in claim 6 wherein said generator comprises means coupled to said logic block for sequentially generating the accumulated run length of each color unit in said picture data block at each operation of said passing and inverting means.

8. A facsimile device as in claim 7 wherein said sequential generating means comprises first logic means coupled to said passing and inverting means for generating an output string of ONEs and ZEROs whose ratio is indicative of the accumulated run length of a color unit in said data block;

a register coupled to said first logic means for holding an output string indicative of the accumulated run length of a previous color unit in said block; and second logic means coupled to said first logic means for generating signals indicative of said accumulated run length in binary.

9. A facsimile device as in claim 1 further comprising a means coupled to said control logic and responsive to said coding line data blocks for generating coded run lengths of color units in said coding line whereby said control logic selects said coded run lengths for encoding positions of change picture elements in said coding line without reference to said reference line under predetermined conditions.

10. In a facsimile system for digitized picture elements of lines of units of alternating color, a method for decoding a coded line of said digitized picture elements coded with respect to a reference line of said digitized picture elements in a sequence of codewords, said method comprising (a) accumulating the run lengths of color units previous to a color change picture element in said reference line;

(b) decoding a codeword to generate a displacement value;

(c) combining said accumulated run lengths of said reference line color units and said displacement value to generate the accumulated run length of a color change picture element in said coded line; and (d) determining the difference in the accumulated run lengths between said color change picture element and the color change picture element immediately previous on said coded line;

whereby said difference, being the run length of the color unit previous to said color change picture element, is the decoded data from said codeword.

11. The decoding method as in claim 11 wherein the steps (a), (b), (c) and (d) are selectively repeated in predetermined sequences responsive to a determination of the accumulated run lengths of said reference line color change picture elements and the color change picture element previous to said reference line color change picture element with respect to the accumulated run length of said coded line color change picture element, each repetition of steps applying to successive color change picture elements in said coded and reference lines.

12. The method as in claim 11 further comprising (e) decoding a codeword indicating a horizontal mode;

(f) decoding the run length of a first color unit;

(g) decoding the codeword following said next codeword to determine the run length of a second color unit of opposite color;

whereby said coded line is at least partially run length decoded.

13. The decoding method as in claim 12 further comprising (h) decoding a codeword indicating a pass mode;

(i) determining a first difference between the accumulated run lengths of a reference line color change picture element and a coded line color change picture element;

(j) accumulating the run length of the next reference line color change picture element;

(k) determining a second difference between the accumulated run lengths of said reference line picture element and said next reference line picture element; and (l) adding the sum of said first and second differences to determine a partial sum of the run length of a coded line color unit.

* * * * *